Feb. 19, 1952     A. ST. MAURICE ET AL     2,586,111
COMBINED FUEL AND BRAKE CONTROL FOR AUTOMOBILES
Filed Oct. 26, 1948     2 SHEETS—SHEET 2
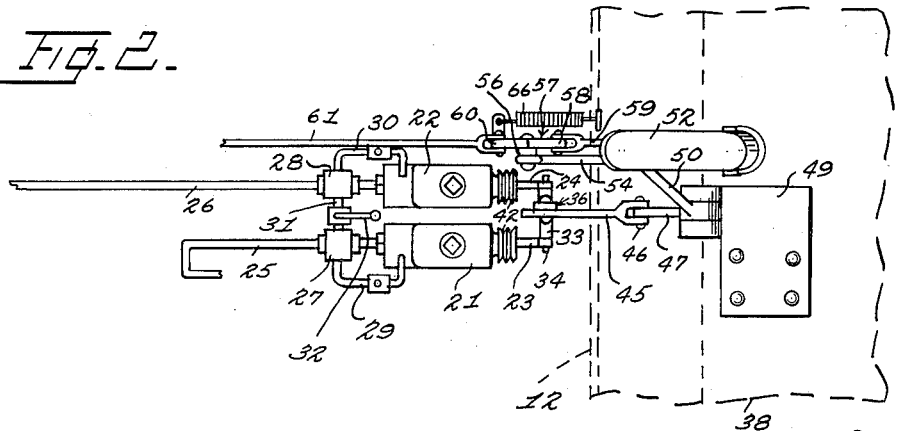
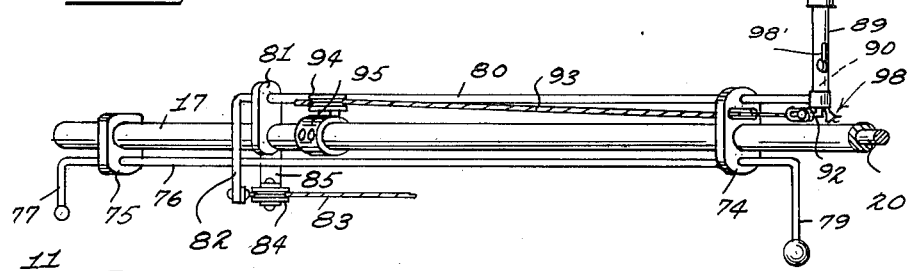
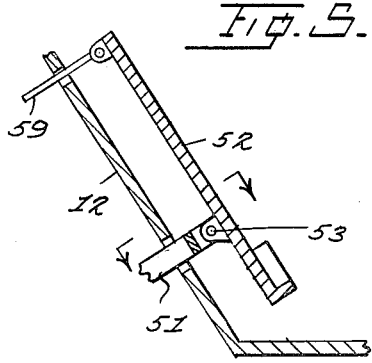
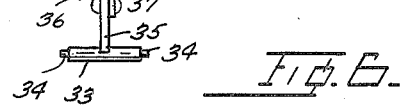
INVENTOR.
Armand St. Maurice
BY Joseph S. Candella
McMorrow, Berman + Davidson
ATTORNEYS Patented Feb. 19, 1952

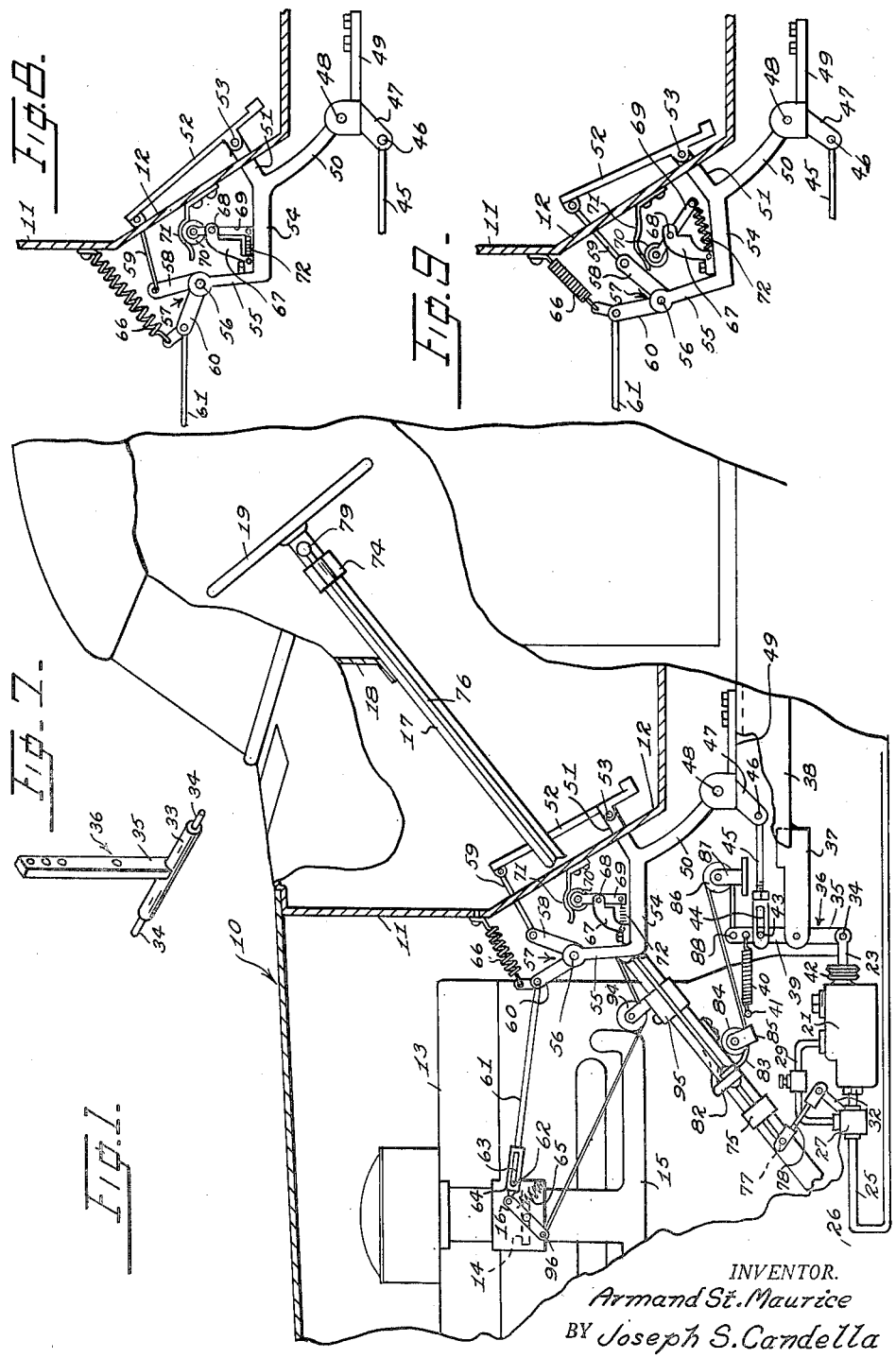

2,586,111

UNITED STATES PATENT OFFICE 2,586,111

COMBINED FUEL AND BRAKE CONTROL FOR AUTOMOBILES

Armand St. Maurice and Joseph S. Candella, Niagara Falls, N. Y.

Application October 26, 1948, Serial No. 56,524

1 Claim. (Cl. 192—3)

1

Our invention relates to combined fuel and brake controls for automobiles, and specifically to improved means for applying and releasing the brakes, together with means for feeding and cutting off fuel which is operatively associated with the brake-applying and releasing means.

With the foregoing in view, it is an object of our invention to provide improved combined fuel and brake controls for automobiles.

A further object is to provide improved combined fuel and brake controls for automobiles, wherein at least a pair of such controls are operatively associated with a single foot-operated element for actuation independently of each other, and/or wherein at least two of said controls are operatively associated with a manual control located on the steering column for actuation independently of each other and independently of said foot controls.

A further object is to provide an improved combined fuel and brake control for an automobile which includes steering column-carried means mounting said combined control, and wherein said means includes means mounting a horn button and/or means mounting a headlight dimmer switch.

Other objects and advantages reside in the particular structure of the invention, combination and arrangement of the several parts thereof, and will be readily understood by those skilled in the art upon reference to the attached drawings in connection with the following specification, wherein the invention is shown, described and claimed.

In the drawings:

Figure 1 is a fragmentary elevational view of an automobile showing the controls of the invention applied thereto, parts of the automobile being broken away and shown in longitudinal vertical section;

Figure 2 is a fragmentary plan view showing the foot-operated controls;

Figure 3 is a fragmentary plan view showing the manually-operated controls;

Figure 4 is a fragmentary front elevational view of the foot-actuated controls, parts being omitted;

Figure 5 is a fragmentary longitudinal vertical sectional view through the pedal of the foot-operated controls;

Figure 6 is a fragmentary vertical sectional view taken substantially on the plane of the line 6—6 of Figure 5;

Figure 7 is a perspective view of a detail apart from the rest of the structure;

2

Figure 8 is a fragmentary vertical sectional view like a portion of Figure 1, but showing the parts in a fuel-feeding position;

Figure 9 is a view like Figure 8, but showing the parts in a brake-setting position.

Referring specifically to the drawings, wherein like references have been used throughout the several views to designate like parts, 10 in Figure 1 designates generally any suitable automobile including a fire wall 11 and footboard 12 separating the driver's compartment from the engine compartment. Any suitable internal combustion engine 13 is provided in the engine compartment and provided with a fuel-control valve 14 operatively associated with the intake manifold 15 of the engine. A fuel valve lever 16 exteriorly of the manifold 15 has been provided for actuation by means to be described later. A steering column 17 is fixed to the dashboard 18 and has the usual steering wheel 19 fixed to any suitable steering shaft 20, Figure 3, which extends axially of the column 17 interiorly thereof. As so far described, the structure may be conventional and forms no part of our invention.

As best seen in Figures 1 and 2, the automobile 10 includes a hydraulic or fluid braking system which comprises a master cylinder 21, a second master cylinder 22 and piston rods 23 and 24 for the cylinders. The cylinders include pressure lines 25 and 26 leading to the rear and front wheels, respectively, of the automobile. The pressure lines 25 and 26 pass through fittings 27 and 28 which include hill-holding valves, not shown. Likewise, the fittings 28 and 27 are connected by branch conduits 30 and 29, respectively, to the cylinders 22 and 21 for the return flow of fluid to the cylinders. A single valve stem 31 is journaled in each cylinder 27 and 28 and operatively connected to the valves contained therein, whereby to open the valves when the stem 31 is rotated in one direction and close the valves when they are rotated in the other direction. An actuating lever 32 for the valve stem 31 is fixed thereto intermediate the fittings 27 and 28. Means for operating the valve lever 32 and the valve stem 31 will be described later. The rear ends of the pistons 23 and 24 are pivoted to the reduced ends 34 of a crosshead 33. An intermediate portion of the crosshead 33 is fixed to the lower arm 35 of a rock lever 36 which is pivoted to any suitable bracket 37, Figure 1, which is fixed to a suitable portion of the vehicle frame 38. The upper arm 39 of the lever 36 has secured thereto a contractile spring 40, the other end of which is fixed to a suitable frame portion 41, Figure 1.

As above described, it is apparent that the spring 40 loads the lever 36 for pivotal movement in a counterclockwise direction, as viewed in Figure 1, whereby the pistons 23 and 24 are moved in a direction to release the vehicle brakes. Likewise, it is apparent that by rocking the lever 36 in a clockwise direction, the pistons 23 and 24 will be moved in a direction to force brake fluid through the conduits 25 and 26 to the rear and front wheels, respectively. It should be understood in this connection that the piston rods 23 and 24 extend through the usual boots 42 and are slightly rockably connected to the usual pistons, not shown, whereby actuation of the piston rods is possible without binding upon the pivoting of the lever 36.

The lever arm 39 includes a pin 43 which works in a slot 44 in the front end of a link 45. The rear end of the link 45 is pivoted, as at 46, to an arm 47 of a brake pedal lever which is pivoted, as at 48, to any suitable bracket 49 fixed on the vehicle frame 38. The brake pedal lever likewise includes a second arm 50 which extends upwardly and forwardly below the floorboard 12. Such lever arm 50 includes a rearward extension 51 which is slidable in the floorboard 12 and extends upwardly and rearwardly therethrough. A brake pedal 52 is pivoted, as at 53, to the rear or free end of the extension 51. The lever arm 50 likewise includes a forward extension 54 which terminates in an upwardly-directed arm 55, the free end of which is pivoted, as at 56, to the fulcrum of a bell crank 57. The bell crank 57 includes a rear arm 58 which is pivoted to a link 59, the rear end of which is pivoted to the upper or forward end of the pedal 52. The other arm 60 of the bell crank 57 is pivotally connected to a link 61, the forward end of which is connected by means of a pin 62 working in a slot 63 of a connector 64. The connector 64 is pivotally connected to one end of the actuating arm 16 for the fuel-control valve 14. The arrangement is such that when the bell crank 57 is rotated in a counterclockwise direction, as viewed in Figure 1, the link 61, together with the pin 62 and connector 64, will cause the actuating lever 16 for the fuel valve to be moved in a counterclockwise direction and open the fuel-control valve 14. A spring 65 loads the actuating lever 16 for the fuel valve 14 to the closed position. A contractile spring 66 is likewise fixed to the free end of the bell crank arm 60 and to the fire wall 11, whereby to load the bell crank 57 in a clockwise direction. The effect of the spring 66 is to load the bell crank 57 so that the link 59 on the arm 58 normally maintains the front end of the pedal 52 in an elevated position. Obviously, upon depression of the front end of the pedal 52, the bell crank 57 will be pivoted in a counterclockwise direction whereby to open the fuel valve 14 as aforesaid. The action aforesaid is clearly shown in Figure 8. At the same time, when pressure is applied by the heel of the driver's foot to the rear end of the pedal 52, the actuating lever arm 50 for the brake will be depressed, whereby the lower arm 47 is moved rearwardly to apply the brakes. At the same time, this downward movement of the extension 55 of the lever arm 50, together with the action of the spring 66, causes a pivotal movement of the bell crank 57 in a clockwise direction, whereby to maintain the front end of the pedal 52 elevated, as shown in Figure 9. Thus, the brakes may be applied and the fuel valve 14 closed simultaneously merely by relieving pressure on the front end of the pedal 52 and applying pressure to the rear end of the pedal. Likewise, fuel may be fed to the engine 13 by depressing the front end of the pedal 52 without at the same time applying the brakes. This is accomplished merely by depressing the forward end of the pedal 52. To assist in maintaining the brake lever 50 immobile while fuel is being fed to the engine, there has been provided a latch now to be described and best seen in Figures 1, 8 and 9.

Thus, a bracket 67 is fixed on the forward extension 54 of the brake lever arm 50. A pivot 68 on the bracket 67 pivots a two-arm lever 69 thereto intermediate the ends of the lever. The upper end of the lever 69 rotatably mounts a roller latch dog 70 which rollably engages a spring latch detent 71 which is fixed to the under side of the floorboard 12. The lower end of the lever 69 has secured thereto a contractile spring 72, the other end of which is connected to the bracket 67, whereby the lever 69 is loaded in a clockwise direction so that the dog 70 is normally engaged with the detent 71. At the same time, when the brake lever arm 50 is moved upwardly in a clockwise direction, the spring 72 permits the lever 69 to be pivoted in a counter-clockwise direction, Figure 9, to facilitate the engagement of the dog 70 with the detent 71. Thus, the latch just described releasably maintains the brake lever arm 50 in the position shown in Figures 1 and 8 against accidental disengagement when the upper end of the pedal 52 is depressed to feed fuel to the engine 13. At the same time, the latch is not sufficiently strong to present any real resistance to actuation of the brakes when the rear end of the pedal 52 is depressed to rock the bell crank lever 47 in a counter-clockwise direction to set the brakes.

Referring once more to the hill-holding valves contained in the fittings 27 and 28, the lever 32 is actuated by means now to be described and best seen in Figures 1 and 3. Such means comprises an upper and a lower guide 74 and 75, respectively, fixed on the steering column 17 in longitudinally-spaced relation. The guides 74 and 75 rotatably mount a rod 76 therein. The lower end of the rod 76 is laterally directed, as at 77, and pivotally connected to the actuating lever 32 for the hill-holding valves by means of a link 78, Figure 1. The upper end of the rod 76 is likewise laterally directed, as at 79, to provide a handle for rotating the rod 76 in the guides or bearings 74 and 75. As best seen in Figure 1, when the rod 76 is rotated so that the lower extension 77 moves upwardly, the link 78 pivots the handle or lever 32 for the hill-holding valves in a counter-clockwise direction to set the valves so as to maintain pressure in the pressure lines 25 and 26 and maintain the brakes set. Obviously, a reverse rotation of the rod 76 opens the hill-holding valves and permits the brakes to be released.

The device according to the invention likewise contemplates the provision of means now to be described for manually actuating the brakes and/or the fuel-control valve. Such means comprises a shaft 80 rotatably mounted in the upper guide 74 at the opposite side of the steering column 17 and also in a second guide 81 likewise fixed to the steering column 17 in downwardly-spaced relation to the guide 74. The lower end of the shaft 80 is laterally directed, as at 82, and operatively connected to a cable 83. The cable 83 extends around a sheave 84 carried by a bracket 85 fixed to the vehicle frame or to the steering column 17. The cable 83 likewise extends around a second sheave 86 rotatable on a frame-carried bracket 87. The free end of the cable 83 is fixed to the upper end of the lever 36 aforesaid for actuating the pistons 23 and 24, as shown at 88, Figure 1. Thus, when the shaft 80 is rotated so that the end or arm 82 is elevated, as viewed in Figure 1, a pull is exerted on the cable 83 whereby the lever 36 is pivoted in a clockwise direction to actuate the brakes. The pin 43 of such lever works in the slot 44 of the link 45 so that this action is not transmitted to the pedal 52. Likewise, the slot 44 permits actuation of the pedal 52 without exerting a pull on the cable 83.

To rotate the shaft 80, the upper end thereof is laterally directed, as at 89, to provide a handle. The handle 89 is tubular and rotatably mounts therein a control rod or shaft 90 for the fuel-control valve 14. The outer end of the shaft 90 is enlarged to provide a finger grip 91 which is rotatable relative to the handle 89. The inner end of the shaft 90 is laterally directed to provide a lever arm 92, the free end of which is connected to a cable 93. The cable 93 passes around a sheave 94 fixed on a steering column-carried bracket 95 and is connected, as at 96, to the opposite end of the fuel valve lever 16. Thus, rotation of the finger grip 91 in one direction is effective to exert a pulling force on the cable 93, whereby the fuel valve lever 16 is rocked in a counter-clockwise direction against the action of the spring 65. At the same time, the pin-and-slot connections 62 and 63 of the lever 16 with the link 61 permit such rocking of the lever 16 without any motion being transmitted to the bell crank 57. It follows from the foregoing that the fuel control and brakes may be independently operated either manually or by the feet of the driver.

A further feature of the invention is the provision shown in Figure 3 of a horn button 97 connected by wires 98 to any suitable vehicle horn, not shown. The horn button 97 is telescopically mounted inwardly of the finger grip 91 in fixed relation to the handle 89 except for the usual sliding movement of the button incident to operation. Likewise, the arm 89 has secured thereto any suitable switch 98 for actuating the dimmer or low beam of the vehicle headlights. Thus, all of the arrangements just described may be actuated independently from the handle 89 for the shaft 80.

While we have shown and described what is now thought to be a preferred embodiment of the invention, it is to be understood that the same is susceptible of other forms and expressions. Consequently, we do not limit ourselves to the precise structures shown and described hereinabove except as hereinafter claimed.

We claim:

In a motor vehicle having an engine, a brake unit, and a throttle valve controlling the admission of fuel to the engine; a single pedal means including a brake lever attached to the brake unit and having a rearward extension slidably disposed through the floor board of the vehicle, a pedal pivoted on said extension for movement about a horizontal axis, a link slidably disposed through the floor board and pivoted to the forward end of the pedal, a forward extension on the brake lever having an upstanding portion, a bell crank pivoted on said upstanding portion, one arm of said bell crank being pivoted to the link, an actuating arm for the throttle valve pivoted to the other bell crank arm and operatively connected to the throttle valve, spring means connected to the arm of the bell crank carrying the valve actuating arm and floor board for biasing the bell crank toward a position wherein the throttle valve is closed and cooperative latch means carried by the brake lever and the floor board for retaining said lever against movement upon depressing the forward end of the pedal to open the throttle valve, said last means including a bracket mounted on the forward extension, an arm pivotally carried by the bracket for vertical swinging movement, a resilient keeper projecting from the floor board, a latch dog rotatably carried by the arm and engaged on said keeper and spring means connected to the bracket and arm for normally retaining the arm in a vertical position with the dog engaging the keeper.

ARMAND ST. MAURICE.
JOSEPH S. CANDELLA.

REFERENCES CITED

The following references are of record in the file of this patent:

UNITED STATES PATENTS

| Number | Name | Date |
|---|---|---|
| 1,397,682 | Robertson | Nov. 22, 1921 |
| 1,403,390 | Cameron | Jan. 10, 1922 |
| 1,928,267 | Rudyk | Sept. 26, 1933 |
| 1,940,081 | Felies | Dec. 19, 1933 |
| 2,015,717 | Hanratty | Oct. 1, 1935 |
| 2,085,550 | Staude | June 29, 1937 |
| 2,110,350 | Winters | Mar. 8, 1938 |
| 2,168,939 | Kraeft | Aug. 8, 1939 |
| 2,193,866 | Alborn | Mar. 19, 1940 |
| 2,244,116 | Poloner | June 3, 1941 |
| 2,257,852 | Nicol | Oct. 7, 1941 |
| 2,279,458 | Harkness | Apr. 14, 1942 |
| 2,352,104 | Kennedy | June 20, 1944 |
| 2,391,129 | Chambers | Dec. 18, 1945 |